United States Patent [19]

Hay

[11] Patent Number: 5,194,563
[45] Date of Patent: Mar. 16, 1993

[54] POLYMERIC SPECIES PRODUCTION

[76] Inventor: Allan S. Hay, 5015 Glencairn Ave., Montreal, Quebec, Canada, H3W 2B3

[21] Appl. No.: 679,104

[22] Filed: Apr. 2, 1991

Related U.S. Application Data

[63] Continuation-in-part of Ser. No. 514,955, Apr. 26, 1990, abandoned, which is a continuation of Ser. No. 223,389, Jul. 25, 1988, abandoned.

[51] Int. Cl.$^5$ .......................... C08G 8/02; C08G 8/26; C08G 10/02
[52] U.S. Cl. .................................... 528/126; 528/137; 528/143; 528/222; 528/223; 528/226; 528/232; 528/242; 568/638
[58] Field of Search ............... 528/126, 137, 143, 222, 528/223, 226, 232, 242; 568/638

[56] References Cited

U.S. PATENT DOCUMENTS 4,337,334 6/1982 Shimizu et al. ..................... 528/137
4,487,918 12/1984 Heitz et al. ........................... 528/212

OTHER PUBLICATIONS

W. F. Hale et al. "Polyaryletters by Nucleophilic Aromatic Substitution II Thermal Stability", *Journal of Polymer Science*, vol. 5, pp. 2399-2414, (1967).

Primary Examiner—Kriellion S. Morgan
Attorney, Agent, or Firm—Swabey Ogilvy Renault

[57] ABSTRACT

Linear aromatic polymeric species, particularly oligomers and polymers are produced under mild conditions in good yield by reacting an at least binuclear aromatic compound with an alkylidene bisphenol in the presence of a non C-alkylatable hydroxy substituted aromatic compound effective to stabilize a generated carbonium ion intermediate; the alkylidene bisphenol may be formed in situ from a ketone or aldehyde in the presence of a catalytic amount of a hydroxy substituted aromatic compound effective to generate a carbonium ion with the ketone or aldehyde; carrying out the reaction under reduced pressure, particularly high vacuum permits direct production of high polymers; the oligomers are useful in the manufacture of high molecular weight engineering or industrial plastics; the polymers may be used directly as such plastics.

24 Claims, No Drawings

POLYMERIC SPECIES PRODUCTION

CROSS-REFERENCE TO RELATED APPLICATIONS

This application is a continuation-in-part of U.S. Ser. No. 514,955 filed Apr. 26, 1990, now abandoned which is a continuation of U.S. Ser. No. 223,389 filed Jul. 25, 1988 now abandoned.

BACKGROUND OF THE INVENTION (a) Field of the Invention

This invention relates to linear aromatic polymeric species, particularly polymers and oligomers and a process for their preparation.

(b) Description of the Prior Art

High molecular weight linear aromatic polymers which consist of aromatic groups joined by isopropylidene groups have attractive physical and chemical properties for use as engineering plastics. The preparation of such polymers from simple, readily available aromatic compounds such as cumyl chloride has not been successful as a result of side condensation reactions which terminate the polymerization.

High molecular weight polymers have been synthesized by a Friedel-Crafts alkylaticnreaction of 2-chloroisopropyl substituted aromatic compounds with other aromatic compounds; for example p-bis(2-chloroisopropyl) benzene has been condensed with diphenyl ether to yield a high molecular weight linear polymer. This polymerization, however, requires stringent reaction conditions including use of a special Friedel-Crafts catalyst typically consisting of nitrobenzene, tritylhexafluoroarsenate and aluminum chloride, low temperatures and a restricted group of solvents. The reaction must also be carried out in the absence of water and oxygen. The stringent reaction conditions required and the difficulty in obtaining highly purified monomers for the reaction have precluded further work on the process.

Transalkylation processes have also been developed employing perfluorinated resin sulfonic acids such as Nafion-H (trade mark) as catalysts. Thus dealkylation of a t-butyl substituted bisphenol in the presence of toluene as acceptor molecule produces t-butyl toluene and unsubstituted bisphenol.

Bisphenol A (4,4'-isopropylidenebisphenol) is manufactured by direct condensation of acetone with a large excess, typically 6 to 10 fold, of phenol in the presence of an acid catalyst, preferably an ion exchange resin. However, this condensation reaction is not quantitative enough to employ as a polymer forming reaction because side polyalkylation reactions and indane forming reactions act as terminating reactions, especially when the stoichiometry approaches 1:2 in the reaction. The synthesis is only successful when a large excess of phenol is used; but even when a large excess is used significant amounts of by-products are formed.

SUMMARY OF THE INVENTION

It is an object of this invention to provide a process for producing linear aromatic polymeric species.

It is a further object of this invention to provide such a process which employs relatively mild reaction conditions and proceeds with high yields of the polymeric species.

It is yet another object of this invention to provide novel polymeric species.

It is still another object of this invention to provide linear aromatic polymeric species in the form of oligomers for polymerization and block copolymer production to produce engineering plastics.

In accordance with one aspect of the invention, a process for producing a linear aromatic polymeric species comprises reacting an at least binuclear aromatic compound with a source of aralkyl carbonium ion in the presence of a non C-alkylatable, hydroxy substituted aromatic compound effective to stabilize the aralkyl carbonium ion.

The source of aralkyl carbonium ion may be an alkylidene bisphenol or corresponding dimethyl ether or may be generated by reaction of an aldehyde or a ketone with a C-alkylatable phenol.

The reaction is, in particular, carried out in the presence of an acid catalyst, in particular a protic acid or a Lewis acid.

The polymeric species contemplated are linear oligomers and polymers.

Thus, in accordance with a particular embodiment of the invention, a process for producing a linear aromatic polymeric species comprises reacting an at least binuclear non-phenolic aromatic compound with a ketone or aldehyde in the presence of a catalytic amount of a hydroxy substituted aromatic compound effective to generate carbonium ions with said ketone or aldehyde, and a non C-alkylatable, hydroxy substituted aromatic compound effective to stabilize the generated carbonium ions.

In accordance with the invention, it has been found that the large excess of phenol in the synthesis of bisphenol-A from acetone and phenol stabilizes the intermediate carbonium ion against formation of polyalkylated products and indane type structures. In this bisphenol synthesis the first intermediate is the 0-alkyl carbonium ion which then reacts further to produce the cumyl cation carbonium ion as illustrated in Equation (I).

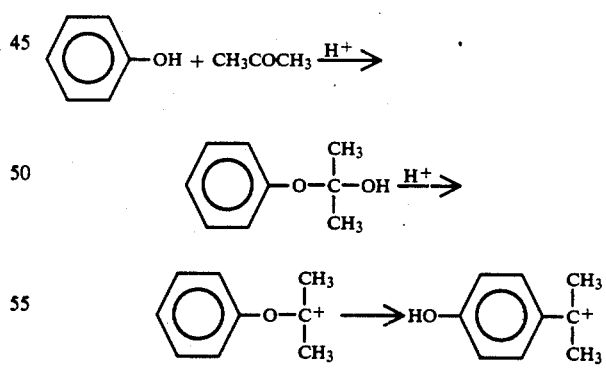

The cumyl cation then alkylates phenol to produce bisphenol-A as the final product.

In accordance with one embodiment of the invention, a small amount of a hydroxy aromatic compound, for example phenol, is employed, in conjunction with an aldehyde or a ketone, as a source of carbonium ions, and a sterically hindered, substituted phenol is used to stabilize the carbonium ion in reactions of this type; the stabilizing phenol is not C-alkylatable because of the steric hindrance.

Since it is an equilibrium reaction, using a large excess of the hydroxy aromatic compound, for example, phenol would favour bisphenol formation.

The carbonium ion C-alkylates the at least binuclear aromatic compound with release of the hydroxy aromatic compound as by-product. Thus the catalyst is regenerated as the process proceeds. The reaction is illustrated in Equation (II)

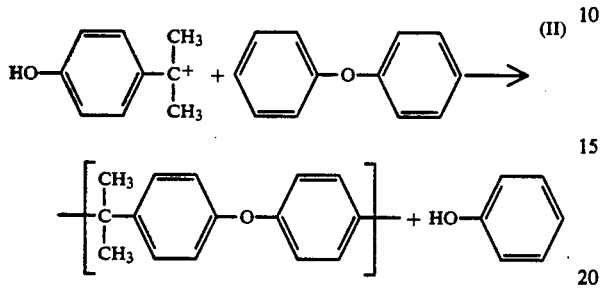

to show production of the basic oligomer unit for the reaction in which the binuclear aromatic compound is diphenyl ether, acetone is employed as ketone and phenol is the catalyst. The carbonium ion is, of course, generated in accordance with Equation (I) above.

The carbonium ion is stabilized by the non C-alkylatable, hydroxy substituted aromatic compound so that by-products are not formed as illustrated in Equation (III) for the case in which the stabilizer is 3,5-dimethylphenol

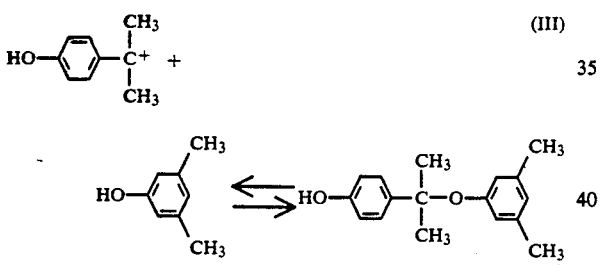

DESCRIPTION OF PREFERRED EMBODIMENTS

Suitable at least binuclear aromatic compounds include phenylbenzene, diphenylether, naphthalene and diphenylthioether and their halo-substituted derivatives, especially the para chloro- and para bromo- derivatives.

In particular, the at least binuclear aromatic compound may be represented as HRX wherein R is a bivalent radical of formula

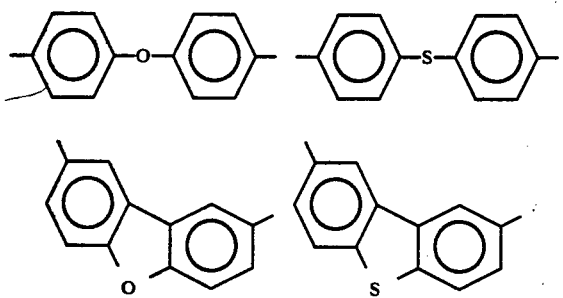

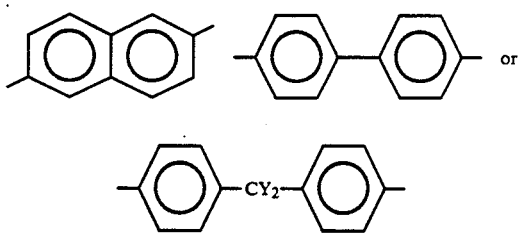

in which each Y is hydrogen or a monovalent hydrocarbon radical of 1 to 14 carbon atoms, and X is a hydrogen or halogen atom, hydroxyl, lower alkyl or lower alkoxy.

The halogen atoms may be selected from F, Cl, Br and I with Cl and Br being preferred.

The lower alkyl and lower alkoxy radicals suitably contain 1 to 4 carbon atoms, methyl and methoxy being preferred.

The source of aralkyl carbonium ion in one aspect of the invention is in particular an alkylidene bisaromatic compound of formula (II)

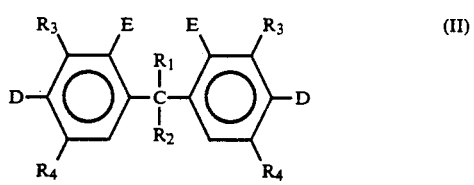

in which:
one of D and E is hydroxyl or methoxy and the other is a hydrogen atom;
$R_1$ is a hydrogen atom, lower alkyl of 1 to 4 carbon atoms or phenyl group;
$R_2$ is lower alkyl of 1 to 4 carbon atoms; or
$R_1$ and $R_2$ together may form with the carbon atom to which they are attached a cyclo lower aliphatic ring of 3 to 6 carbon atoms; and
$R_3$ and $R_4$ are independently selected from hydrogen atoms, halogen atoms, lower alkyl of 1 to 4 carbon atoms and lower alkoxy of 1 to 4 carbon atoms.

In particular the compounds of formula (II) include the alkylidene bisphenols in which D or E is hydroxyl and their corresponding dimethyl ethers in which D or E is methoxy.

In another aspect of the invention, the source of aralkyl carbonium ion is a C-alkylatable hydroxy substituted aromatic compound together with an aldehyde or ketone.

Suitable ketones and aldehydes include the lower aliphatic ketones and aldehydes in which the alkyl groups have 1 to 4 carbon atoms, cyclohexanone and aromatic ketones and aldehydes, for example phenyl lower alkyl ketones such as acetophenone; benzaldehyde; phenylacetaldehyde and tolualdehyde.

Suitable carbonium ion producing C-alkylatable aromatic compounds include phenol, naphthol and their derivatives which are unhindered in the para position; and in particular phenols of formula

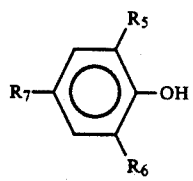
(III)

in which $R_5$, $R_6$ and $R_7$ are independently selected from hydrogen, lower alkyl of 1 to 4 carbon atoms and lower alkoxy of 1 to 4 carbon atoms, provided that at least one of $R_5$, $R_6$ and $R_7$ is a hydrogen atom. Methyl and methoxy are preferred alkyl and alkoxy radicals, respectively.

Suitable carbonium ion stabilizers include 3,5-dialkylphenols, the 3- and 5-substituents being effective to hinder C-alkylation at the adjacent 2,4 and 6 positions. Preferably the 2 and 4 positions are unsubstituted leaving the hydroxyl group unhindered for attack on the carbonium ion, however 2,4,6 trialkyl phenols may also be employed as the carbonium ion stabilizers.

The reaction is conveniently carried out under mild conditions in the presence of the acid catalyst, for the generation of the carbonium ion. Suitable acid catalysts include methane sulfonic acid and p-toluene sulfonic acid and cation exchange resins, for example, sulfonated styrene divinylbenzene copolymer.

Suitably the reaction is carried out at a temperature of 20° C. to 100° C. or higher. Conveniently the reaction is carried out in the presence of a thiol catalyst or accelerator as conventionally employed in the manufacture of bisphenol A.

The formation of indane and/or spirobiindane type side products characteristic of prior processes is greatly reduced with resultant high conversion of the reactants to the desired oligomer or polymer.

In the case in which the carbonium ion is generated from the hydroxy substituted aromatic compound and an aldehyde or ketone, the reaction is preferably carried out with slow addition of the ketone or aldehyde to a reaction mixture of the at least binuclear aromatic compound, the hydroxy substituted aromatic compound and the carbonium ion stabilizer. In this way, the carbonium ion is generated by reaction of the ketone or aldehyde and the hydroxy substituted aromatic compound, the latter aromatic compound being regenerated as the reaction of carbonium ion and at least binuclear aromatic compound proceeds, for reaction with newly added ketone or aldehyde.

The process of the invention produces a hydroxy aromatic compound as a by-product, for example phenol is the by-product of the reaction illustrated in Equation (II) above. As described above this reaction is a transalkylation reaction catalyzed by strong acids, and the reactants and products are in equilibrium.

It is advantageous to continuously remove the by-product hydroxy aromatic compound from the reaction mixture to drive the reaction forward to completion, and this can be achieved by carrying out the reaction under reduced pressure such that the by-product hydroxy aromatic compound is selectively distilled from the reaction medium while the reactants and polymer product remain in the reaction medium. This reduced pressure may suitably take the form of high vacuum conditions such that the reaction mixture refluxes.

The reaction is illustrated in the following schematic in which the binuclear aromatic compound is diphenylether, bisphenol A is employed as the source of aralkyl carbonium ion and 3,5-dimethylphenol is employed to stabilize the carbonium ions.

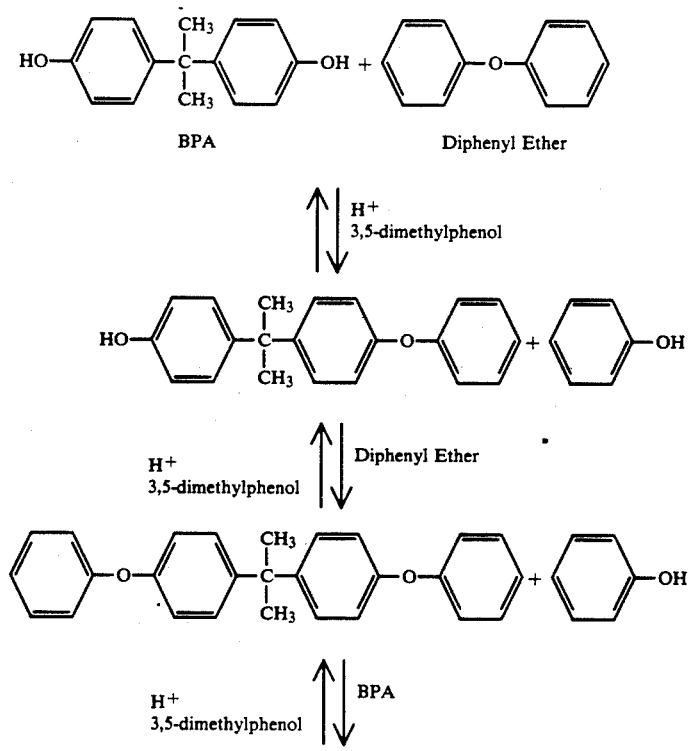

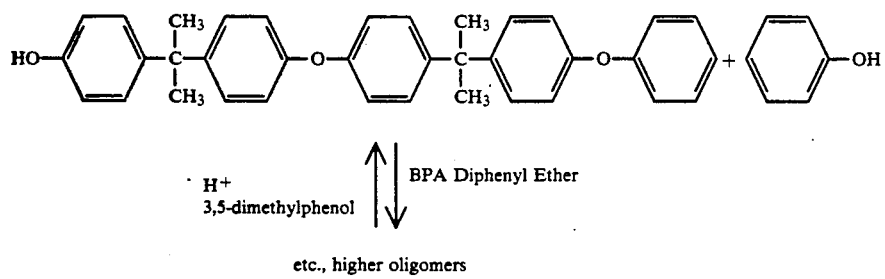

etc., higher oligomers

By carrying out the reaction under high vacuum and by controlling the temperature and carrying the reaction out under conditions such that the reaction mixture is refluxing, the phenol is selectively removed. Since phenol is the lowest boiling material in the reaction mixture it can be selectively removed without also removing the 3,5-dimethylphenol or the diphenyl ether. It is advantageous to run the reaction in the presence of solvents which have boiling points below that of the binuclear aromatic compound, for example diphenyl ether and below that of the stabilizing compound, for example 3,5-dimethylphenol, such as chlorobenzene, o-dichlorobenzene or trichlorobenzene, which can be added to the reaction mixture continuously and removed continuously by distillation. The phenol produced in the reaction then co-distills with this solvent while the diphenyl ether and 3,5-dimethylphenol remain in the reaction mixture.

In the absence of 3,5-dimethylphenol polymers are not formed. At the end of the reaction the polymers are isolated by simply precipitating them from the reaction mixture by the addition of a nonsolvent such as methanol. Analysis by proton nuclear magnetic resonance ($^1$H NMR) shows that the polymers have the 1,4-substitution that would be expected from these structures, as shown in the following formula:

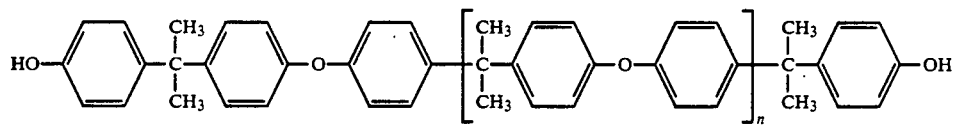

where n is an integer of up to 100. It is advantageous to use the dimethyl ether of bisphenol A in the reaction instead of bisphenol A because anisole is formed in the reaction which has a lower boiling point than phenol and hence is easier to remove from the reaction mixture in accordance with the sequence below. The polymers

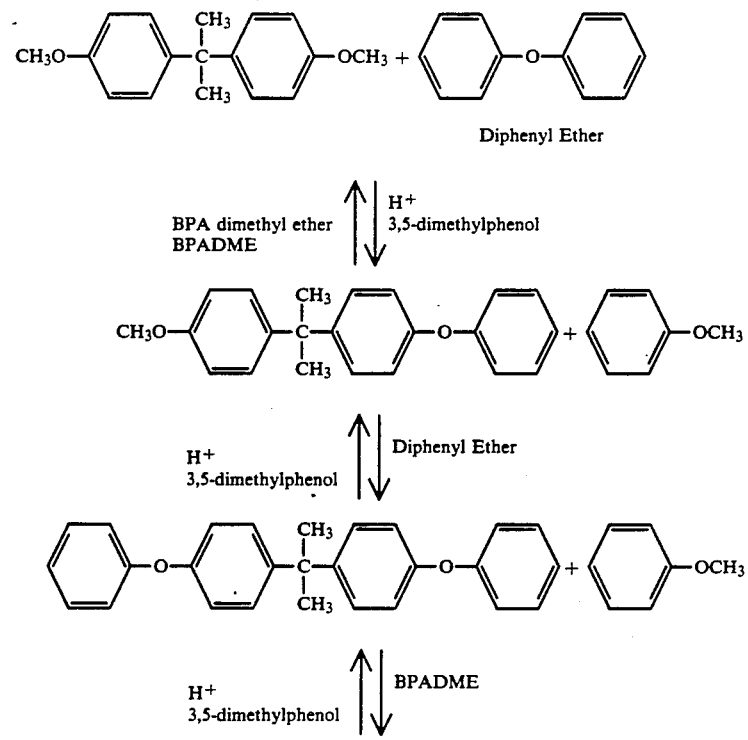

-continued

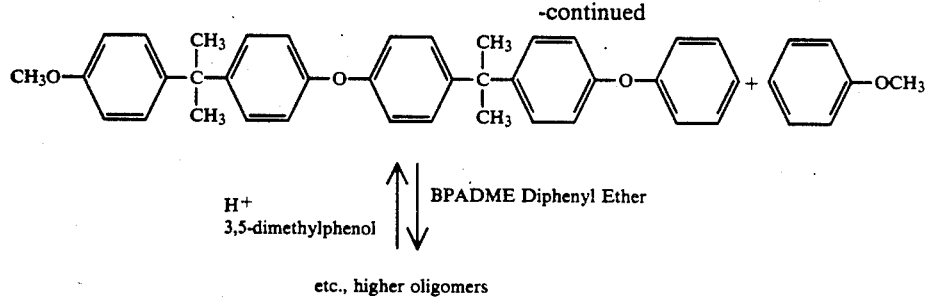

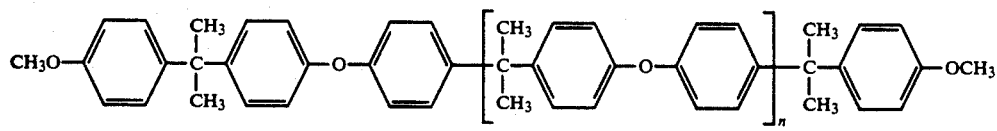

produced are terminated with methoxy groups as shown in the formula below:

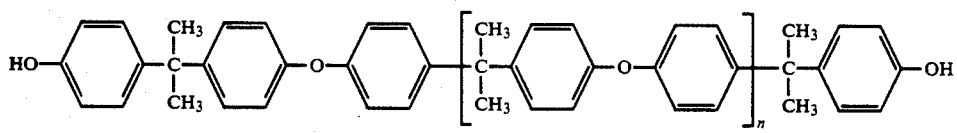

where n is an integer up to 100.

Thus employing the particular reactants of Equations (I), (II) and (III) above, there is produced the polymeric species represented by the formula propane i.e. the oligomer of formula (IC) in which X is a hydrogen atom, R is diphenyl ether and $R_1$ and $R_2$ are both methyl (W.F. Hale et al, Poly(aryl Ethers) by Nucleophilic Aromatic Substitution.II. Thermal Stability: Journal of Polymer Science Vol. 5, pp. 2399-2414(1967).

in which n is an integer typically of 2 to 100.

When n is an integer of 2 to 20, the polymeric species is considered an oligomer; when n is an integer of 20 to 100, the polymeric species is considered a polymer.

In general, the polymeric species produced in accordance with the invention may be represented by the formulae IA, IB or IC

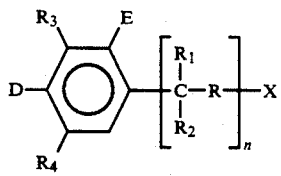 (IA)

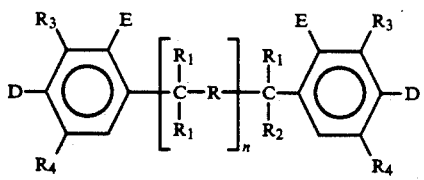 (IB)

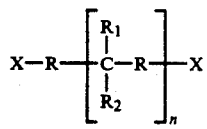 (IC)

in which R, $R_1$, $R_2$, $R_3$, $R_4$, X, D, E and n are as described above.

Polymeric species of the above formulae include novel species which form an aspect of this invention. The only previously described polymeric species within the above formulae is 2,2-bis(4,4'-diphenoxydiphenyl)

The oligomers of the invention can be used in polymerization reactions with various monomers and reagents to produce a wide variety of polymers including polyethers, polysulfides, polyesters, polycarbonates and polyformals. For example, reaction of a polymeric species of formula IC in which X is a bromine atom with sodium sulfide would yield a polysulfide, or reaction with the salt of a bisphenol or bisphenol in the presence of alkalis would yield a polyether.

Reaction of a polymeric species (IA) in which X is a bromine atom, with alkalis at an elevated temperature in the presence of a copper catalyst also produces a polyether.

The polymeric species of formula (IB) can be copolymerized with various monomers to produce polyesters, polycarbonates, polyethers and polyformals.

Employing oligomers of the invention, polymers suitable as engineering or industrial plastics, having high glass transition (Tg) temperatures in the 100° C.-200° C. range may be produced. The aromatic nuclei provide a rigid backbone, whereas the alkylidene linkages and the ether linkages when present provide enhanced solubility and flexibility.

In addition to the aforementioned sources of aralkyl carbonium ion, alkyl and arylacetylenes and isopropenyl carboxylates or ethers can be used as the source of aralkyl carbonium ion in the reaction with the at least binuclear aromatic compound.

EXAMPLES

Example 1 (Comparative)

Reaction of diphenyl ether with BPA

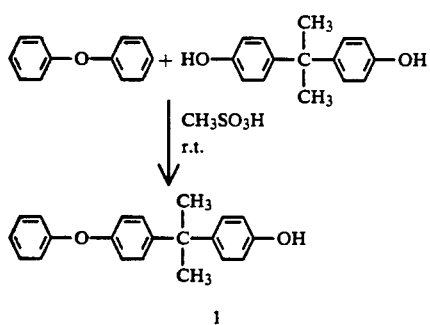

To a suspension of bisphenol-A (BPA, 5.708 g., 25 mmol) and diphenyl ether (34.042 g., 200 mmol) in chloroform (5 ml) at room temperature, was added methanesulfonic acid (3.0 ml) dropwise. After stirring for 36 hours, the reaction mixture was diluted with chloroform (500 ml) and then washed with aqueous sodium hydroxide solution (1 N, 4×150 ml). The organic phase was dried over anhydrous sodium sulfate and the solvent was removed at reduced pressure. The residue was diluted with petroleum ether (300 ml) and extracted with Claise's alkali solution* (2×75 ml). The combined alkaline extracts were diluted with water (100 ml) and cooled to 0° C. and acidified carefully with concentrated hydrochloric acid to pH 1-2. The acidified mixture was then extracted with ether (3×150 ml) and the ether phase was dried over anhydrous sodium sulfate. Removal of the solvent in vacuo and purification of the residue by flash chromatography (15% ethyl acetate in hexane) gave the desired phenol 1 as a syrup; yield 6.10 g (80.2%);

*Claisen's alkali: dissolve 35 g. of potassium hydroxide in 25 mL of water, cool, add 100 ml of methanol, and cool.

$^1$H NMR (200 MHz, CDC;3) 1.65 (s, 6 H, 2 CH$_3$), 4.62 (s, 1 H, OH), 6.74 (d d, 2 H, Ar-H), 6.90 (d d, 2 H, Ar-H), 6.98-7.03 (m, 2 H, Ar-H), 7.07-7.20 (m, 5 H, Ar-H), 7.28-7.36 (M, 2 H, Ar-H); $^{13}$C NMR (300 MHz, CDCl$_3$) 31.07, 41.91, 114,77, 118.28, 118.76, 123.06, 127.97, 128.02, 129.68, 143.02, 145.87, 153.36, 154.87, 157.38.

MS (EI, m/e, relative intensity) 304 M$^+$, 44), 289 (M$^+$—CH$_3$, 100).

Example 2 (Comparative)

Reaction of BPA with Diphenylether at 80°-90° C.

A suspension of BPA (517 mg., 2.5 mmol.) and diphenylether (1.277 g., 7.5 mmol.) was stirred in the presence of either Amberlyst-15 (342 mg.) or methane sulfonic acid (0.2 ml.) at 80°-90° C., (oil bath). After a few hours, a red solution was obtained and the reaction was followed over 18 hours by thin layer chromatography. After 4-5 hours phenol and the dihydroxyspirobiindane (SBI) were the main products. After 18 hours the BPA was all gone and SBI was the principal product

Example 3

Reaction of Diphenylether with Bisphenol-A in the Presence of 3,5-Dimethylphenol

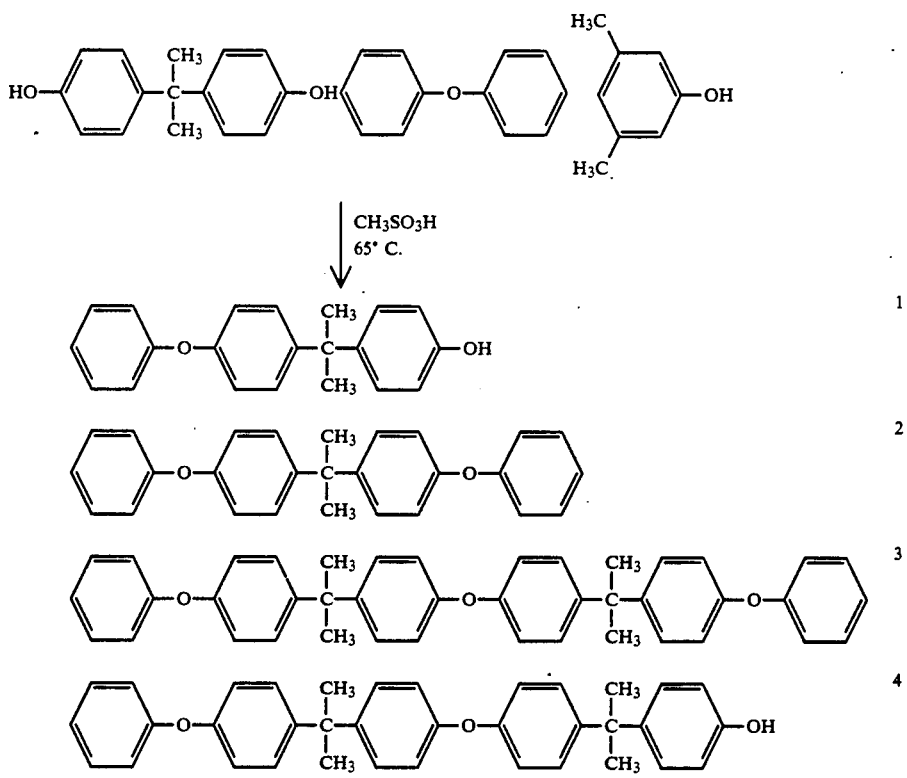

A mixture of BPA (4.564 g., 20 mmol) and diphenyl ether (34.042 g., 0.2 mol) was dissolved in 3,5-dimethyl phenol (24.434 g., 0.2 mol) at 65°-68° C. (oil bath temperature) and methansulfonic acid (4.0 ml) was added. After stirring for 2-3 days, the reaction mixture was cooled to room temperature and diluted with ether (150 ml). The diluted reaction mixture was washed with 10% sodium hydroxide solution (6×50 ml), water (2×50 ml) and brine (50 ml). After drying over anhydrous sodium sulfate, the solvent was distilled in vacuo and excess diphenyl ether was removed by vacuum distillation. The residue was then purified by flash chromatography (petroleum ether, then 10% ethyl acetate in hexane) to give the phenol 1, yield 404 mg., 6.65%, the ether 2, yield 5.40 g., 71.05%, and the ether 3, yield 549 mg., 9.31%, for an 87% overall yield.

*Compound 4 was not isolated, but determined by high pressure liquid chromatography to be present in the amount of 6.7%. The total yield, therefore, is 93.5%.

Analyses.

Compound 2: oil; $^1$H NMR (300 MHz, CDCl$_3$) 1.69 (s, 6 H, 2 CH$_3$), 6.93 (d, 4 H), 7.02 (d d, 4 H), 7.10 (t, 2 H), 7.21 (d, 4 H), 7.33 (d d, 4 H); $^{13}$C NMR (75.43 MHz, CDCl$_3$) 31.08, 42.14, 118.31, 118.83, 123.12, 128.06, 129.71, 145.57, 155.03, 157.37; MS (EI, m/e, relative intensity) 380 (M$^+$, 67.8), 365 (M$^+$—CH$_3$, 100); HRMS (EI, m/z) for C$_{27}$H$_{24}$O$_2$(M$^+$), calcd 380.1776, found 380.1768.

Compound 3: syrup; $^1$H NMR (300 MHz, CDCl$_3$) 1.68 (s, 6 H, 2 CH$_3$), 1.69 (s, 6 H, 2 CH$_3$), 6.91 (2 d, 8 H), 7.02 (d d, 4 H), 7.09 (2 t, 2 H), 7.20 (2 d, 8 H), 7.28 -7.36 (m, 4 H).

Example 4 (Comparative)

Reaction of Diphenyl ether with a Acetone in the Presence of 3,5-Dimethyl

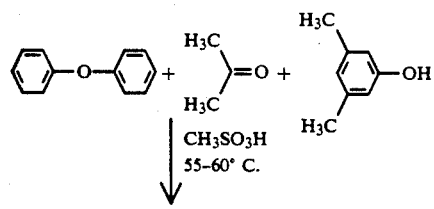

At 55°-60° C., methanesulfonic acid (2.0 ml.) was added into a yellow solution of acetone (580 mg., 10 mmol), diphenyl ether (17.021 g., 0.1 mol), thiosalicylic acid (100 mg.) and 3,5-dimethyl phenol (12.217 g., 0.1 mol). The resulting red solution was stirred at 55°-60° C. for 2-4 days and the reaction was monitored by HPLC. Among other unidentified products, the ether 2 was formed in about 34% yield (identified by HPLC; C-18 reverse phase, methanol, 1.0 ml/min flow rate).

Example 5

Reaction of Diphenyl ether with Acetone in the Presence of Phenol and 3,5-Dimethylphenol At 62°-65° C., methanesulfonic acid (1.0 ml) was added to a solution of acetone (290 mg., 5 mmol), diphenyl ether (8.511 g., 50 mmol), phenol (940 mg., 10 mmol), 3,5-dimethyl phenol (6.109 g., 50 mmol) and a catalytic amount of 1,3-propanedithiol (2 drops). The resulting dark red solution was stirred at 62°-65° C. for 2-4 days. After 4 days, the ratios of the products 1, 2 and 3 (see example 3) were determined by HPLC to be 1:12.8:1.5. Another 5 mmol of acetone (290 mg.) was added into the reaction mixture and the reaction was continued for another 2-4 days. The reaction mixture was then cooled to room temperature and diluted with ether (100 ml). The ether phase was washed with potassium hydroxide solution (1.5 N, 2×50 ml) and dried over anhydrous sodium sulfate. The solvent was removed at reduced pressure and the residue was heater up to 120°-160° C. (0.1 mmHg) using a Kuglrohr distillation apparatus until no more diphenyl ether could be distilled off. The crude products were taken up in 15% ethyl acetate-hexane solution and purified on a short dry silica column eluting with 10% ethyl acetate-hexane solution. After removal of solvents at reduced pressure, the residue weighted 3.02 g. and contained mainly the products 1 (11.7%), 2 (60.8%), 3 (10.0%) and diphenyl ether in the ratio of 4.34:22.61:1.00:5.51 by HPLC. The total yield based on acetone (10 mmol, 580 mg) was 82.5%.

Example 6 (Comparative)

Reaction of 4-Bromodiphenylether with Bisphenol-A

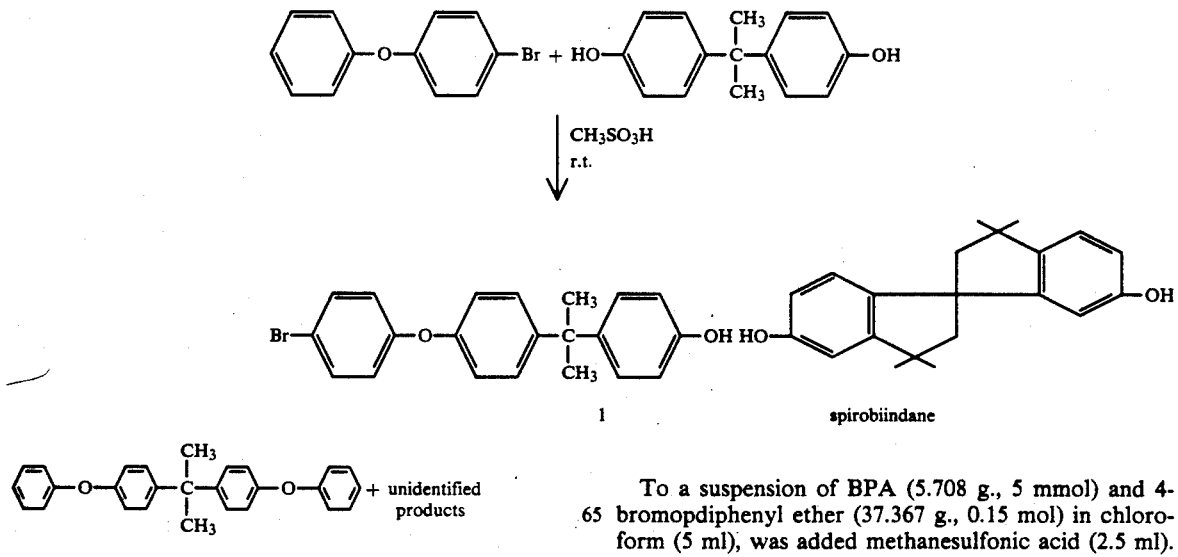

To a suspension of BPA (5.708 g., 5 mmol) and 4-bromopdiphenyl ether (37.367 g., 0.15 mol) in chloroform (5 ml), was added methanesulfonic acid (2.5 ml). The red suspension was stirred at room temperature for 18 hours and at 40° C. for another 14 hours. Thin layer chromatography indicated that the reaction had stopped with the formation of the spirobiindane as a side product while a large amount of BPA still remained unreacted. The reaction mixture was diluted with methylene chloride (100 ml) and washed with sodium hydroxide solution (1 N, 5×35 mL) and water 30 ml). After drying, evaporating the solvents and purification by column chromatography, the desired phenol 1 was obtained as white crystals in very low yield (<10%), m.p. 143.5°-144.5° C.; $^1$H NMR (200 MHz, CDCl$_3$) 1.66 (s, 6 H, 2 CH$_3$), 5.01 (br, s, 1 H, OH), 6.76 (d, J=8.6 Hz, 2 H), 6.89 (d, J=9.0 Hz, 2 H), 6.90 (d, J=8.8 Hz, 2 H), 7.12 (d, J=8.8 Hz, 2 H), 7.21 d, J=8.4 Hz, 2 H), 7.42 (d, J=9.0 Hz, 2 H); $^{13}$C NMR (75.41 MHz, CDCl$_3$) 31.05, 41.95, 114.81, 115.41, 118.44, 120.30, 127.96, 128.16, 132.61, 142.91, 146.44, 153.37, 154.34, 156.70; HRMS (EI, m/z) for C$_{21}$H$_{19}$ Br$^{79}$O$_2$ (M+·): calcd 382.0569, found 382.0571.

Example 7 (Comparative)

Reaction of 4-Bromodiphenylether with Bisphenol-A in the Presence of 3,5-Dimethylphenol

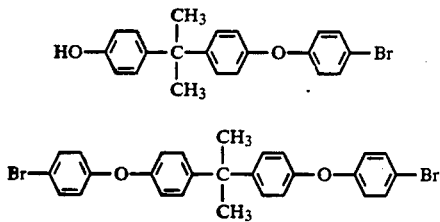

BPA (1.141 g., 5 mmol) and 4-bromodiphenyl ether (12.455 g., 50 mmol) were dissolved in 3.5-dimethyl phenol (6.109 g., 50 mmol) at 62°-65° C. (oil bath temperature) and methanesulfonic acid (1.0 ml) was then added. The resulting red solution was stirred at 65° C. for 2-4 days and the reaction was followed by HPLC. The reaction was cooled to room temperature and ether (100 ml) was added. The ether solution was washed with sodium hydroxide solution (1 N, 10×20 ml) until no more 3,5-dimethylphenol could be detected by TLC. The ether was distilled and the residue was diluted with petroleum ether (60 ml) which was then extracted with Claisen's alkali (2×30 ml). The combined basic extracts were acidified with concentrated hydrochloic acid to pH 1 and the acidified mixture was extracted with ether (3×75 ml). The combined ether extracts were washed with water (50 ml) and dried over anhydrous sodium sulfate. Removal of solvent and flash chromatography of the residue (10% ethyl acetate in hexane) gave the desired phenol 1 as white crystal; yield 410 mg (21.5%); m.p. 143.5°-144.5° C.

After washing with Claisen's alkali, the petroleum ether phase containing compound 2 was concentrated in vacuo and excess of bromodiphenyl ether was distilled at reduced pressure. The residue was purified by chromatography (petroleum ether, then 2.5% ethyl acetate in hexane) to yield the dibromide 2; 550 mg (20.5%); $^1$H NMR (200 MHz, CDCl$_3$) 1.67 (s, 6 H, 2 CH$_3$), 6.88 (d, 4 H, J=9.0 Hz, H$_{b,b'}$), 6.90 (d, 4 H, J=8.8 Hz, H$_{c,c'}$), 7.20 (d, 4 H, J=8.8 Hz, H$_{d,d'}$), 7.41 (d, 4 H, J=9.0 Hz, H$_{a,a'}$); $^{13}$C NMR (75.41 MHz, CDCl$_3$) 31.03, 42.20, 115.49, 118.45, 120.37, 128.17, 132.63, 145.98, 154.52, 156.62.

Example 8

Reaction of 4-Bromodiphenylether with Acetone in the Presence of Phenol and 3,5-Dimethylphenol

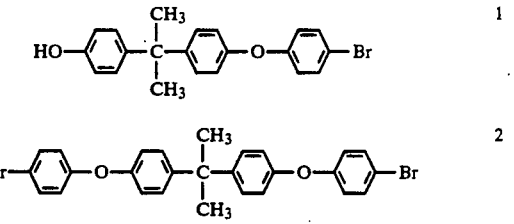

Methanesulfonic acid (1.0 ml) was added to a yellow solution of acetone (290 mg., 5 mmol), phenol (940 mg., 10 mmol), 4-bromodiphenyl ether (12.456 g., 50 mmol), 3,5-dimethyl phenol (6.109 g., 50 mmol) and a catalytic amount of propanedithiol at 63° C. (oil bath). The resulting red solution was stirred at 63° C. overnight (18 hrs) and another 1 ml of methanesulfonic acid was added into the reaction mixture. The reaction was continued for another 18-24 hours and monitored by HPLC. The reaction mixture was then cooled to room temperature and diluted with ether (100 ml). After washing with concentrated sodium bicarbonate solution the ether was first removed by normal distillation and the crude reaction mixture was then distilled at reduced pressure to remove phenol, 3,5-dimethyl phenol and excess of 4-bromodipheyl ether. The residue was then purified by flash chromatography (petroleum ether, then 10% ethyl acetate in hexane) to yield the desired phenol 1 (6.8% ) and the dibromide 2 (48.0%)

Example 9

Diphenyl ether, 1.7 g. (10 mmole), bisphenol A, 3.04 g. (13.3 mmole) 3,5-dimethylphenol 6.10 g. (50 mmole, trifluoromethanesulfonic acid (0.01 equivalents), trichlorobenzene 5.0 ml, were refluxed at 60° C. under high vacuum. o-Dichlorobenzene (60 ml) was added dropwise to the reaction mixture over 47 hours using a flow controller to maintain a slow distillation. The reaction mixture was poured into methanol to give a white precipitate of the polymer. It was filtered and purified by dissolving in chloroform and reprecipitating from methanol. The product was filtered, and dried overnight under high vacuum. A yield of 48% was obtained Samples were taken for NMR and DSC. The polymer has a glass transition temperature of 70° C.

Example 10

Diphenyl ether, 1.7 g., (10 mmole), 3,5-dimethylphenol 6.10 g. (50 mmole), trifluoromethanesulfonic acid (0.1 ml), trichlorobenzene 5.0 ml, were refluxed at 42° C. under high vacuum. Bisphenol A dimethyl ether (BPDME) 3.4 g. (13.3 mmole), dissolved in o-dichlorobenzene (60 ml), was added dropwise to the reaction mixture over 3 hours using a flow controller. After the addition of the bisphenol dimethylether, o-dichlorobenzene was added continuously to the reaction to maintain a slow distillation. The reaction was stopped after 18 hours. The reaction mixture was poured into methanol to give a white precipitate of the polymer. It was filtered and purified by dissolving in chloroform and reprecipitating from methanol. The product was filtered, and dried overnight under high vacuum. A yield of 81% was obtained. Samples were taken for NMR and DSC. The polymer has a glass transition temperature of 93° C. From ¹H NMR analysis the ratio of methoxy end groups to methyl groups in the isopropylidene group indicates a degree of polymerization of 34.

I claim:

1. A process for producing a linear aromatic polymeric species comprising:
reacting an at least binuclear non-phenolic aromatic compound with a source of aralkyl carbonium ion in the presence of a molar excess of a non C-alkylatable phenol effective to stabilize the aralkyl carbonium ion, at a temperature of 20° C. to 100° C.

2. A process according to claim 1 wherein said source is an alkylidene bisphenol.

3. A process according to claim 2 carried out in the presence of an acid catalyst selected from protic acids and Lewis acids.

4. A process according to claim 1 wherein said source comprises a combination of a C-alkylatable hydroxy substituted aromatic compound and an aldehyde or ketone.

5. A process according to claim 1 wherein said source of aralkyl carbonium ion is an alkylidene bisaromatic compound of formula (II):

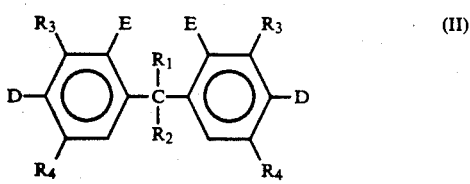

in which:
one of D and E is hydroxyl or methoxy and the other is a hydrogen atom;
R₁ is a hydrogen atom, lower alkyl of 1 to 4 carbon atoms or phenyl group;
R₂ is lower alkyl of 1 to 4 carbon atoms; or
R₁ and R₂ together may form with the carbon atom to which they are attached a cyclo lower aliphatic ring of 3 to 6 carbon atoms; and
R₃ and R₄ are independently selected from hydrogen atoms, lower alkyl of 1 to 4 carbon atoms and lower alkoxy of 1 to 4 carbon atoms.

6. A process according to claim 5 wherein said alkylidene bisaromatic compound of formula (II) is bisphenol A dimethyl ether.

7. A process according to claim 2 wherein said alkylidene bisphenol is bisphenol A.

8. A process according to claim 1 wherein said reaction is carried out under a reduced pressure and a reaction medium is established in which hydroxy-substituted aromatic compound generated as a by-product in the formation of said aralkyl carbonium ion from said source is selectively distilled from said reaction medium under the effect of said reduced pressure.

9. A process according to claim 8 wherein said reaction is under vacuum and the reaction is carried out in the presence of a solvent having a boiling point below that of said binuclear non-phenolic aromatic compound, and below that of said non C-alkylatable phenol.

10. A process according to claim 9 wherein said solvent is selected from chlorobenzene, o-dichlorobenzene and trichlorobenzene and is added continuously to the reaction medium, and is co-distilled from the reaction medium with said by-product hydroxy substituted aromatic compound.

11. A process for producing a linear aromatic oligomer comprising:
reacting a binuclear non-phenolic aromatic compound with a ketone or aldehyde in the presence of a hydroxy substituted aromatic compound effective to generate a carbonium ion with said ketone or aldehyde, and a molar excess of a non C-alkylatable phenol effective to stabilize the generated carbonium ion, at a temperature of 20° C. to 100° C.

12. A process according to claim 11 wherein said hydroxy substituted aromatic compound, effective to generate a carbonium ion, is phenol and said non C-alkylatable phenol is a 3,5-dialkylphenol.

13. A process according to claim 11 carried out in the presence of an acid catalyst selected from protic acids and Lewis acids.

14. A process according to claim 12 wherein said binuclear aromatic compound is selected from phenylbenzene, diphenylether, naphthalene and diphenylthioether and their para-halo-substituted derivatives.

15. A process according to claim 14 wherein said binuclear aromatic compound is reacted with a ketone selected from lower alkyl ketones in which the alkyl groups contain 1 to 4 carbon atoms and phenyl(lower)alkyl ketones.

16. A process according to claim 14 wherein said binuclear aromatic compound is reacted with an aldehyde selected from lower alkyl aldehydes in which the alkyl group has 1 to 4 carbon atoms, benzaldehyde and tolualdehyde.

17. A process according to claim 13 wherein said acid catalyst is a cation exchange resin.

18. A process according to claim 17 wherein said cation exchange resin is a sulfonated styrene divinylbenzene copolymer.

19. A process according to claim 11 for producing a linear aromatic oligomer comprising:
reacting a binuclear non-phenolic aromatic compound with a ketone or aldehyde in the presence of a hydroxy substituted aromatic compound effective to generate a carbonium ion with said ketone or aldehyde, and a non-C-alkylatable phenol effective to stabilize the generated carbonium ion, at a temperature of 20° C. to 100° C.

20. A process according to claim 19 wherein said reacting is under vacuum and the reacting is carried out in the presence of a solvent having a boiling point below that of said binuclear non-phenolic aromatic compound, and below that of said non C-alkylatable phenol.

21. A process according to claim 19 wherein said solvent is selected from chlorobenzene, o-dichlorobenzene and trichlorobenzene and is added continuously to the reaction medium, and is co-distilled from the reaction medium with said by-product hydroxy substituted aromatic compound.

22. A polymeric species of formulae IA, IB or IC:

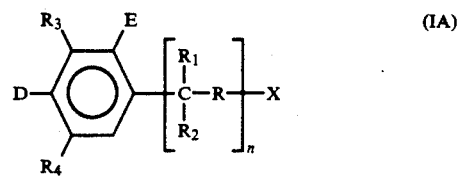

-continued

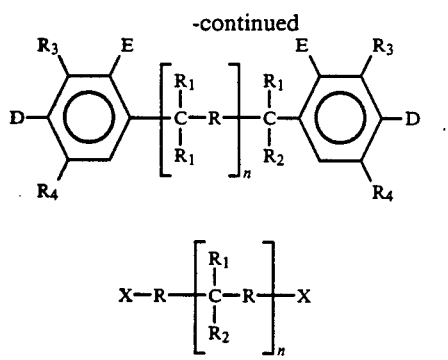

in which:
R is selected from

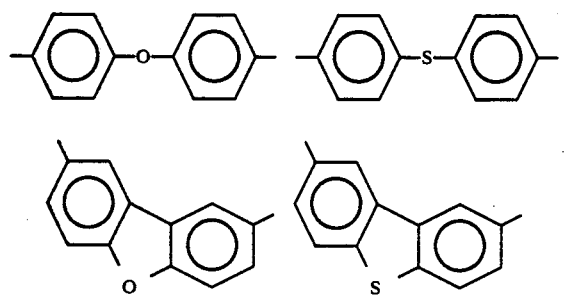

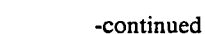

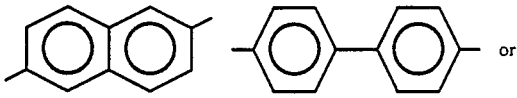

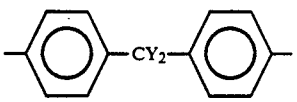

one of D and E is hydroxyl or methoxy and the other is a hydrogen atom;

$R_1$ is a hydrogen atom, lower alkyl of 1 to 4 carbon atoms or phenyl;

$R_2$ is lower alkyl of 1 to 4 carbon atoms;

or $R_1$ and $R_2$ together with the carbonium ion to which they are attached form a cyclo lower aliphatic ring of 3 to 6 carbon atoms;

$R_3$ and $R_4$ are independently selected from hydrogen atoms, halogen atoms, lower alkyl of 1 to 4 carbon atoms and lower alkoxy of 1 to 4 carbon atoms;

X is a hydrogen or halogen atom, hydroxyl, lower alkyl or lower alkoxy, and n is an integer of 1 to 100, provided that in formula (IC), when each X is a hydrogen atom, R is diphenyl ether and $R_1$ and $R_2$ are both methyl, n is an integer of 2 to 100.

23. A polymer according to claim 22 of formula;

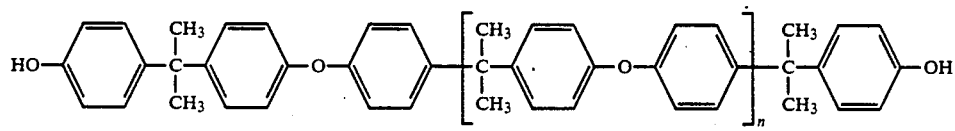

wherein n is an integer of 2 to 100.

24. A polymer according to claim 22 of formula:

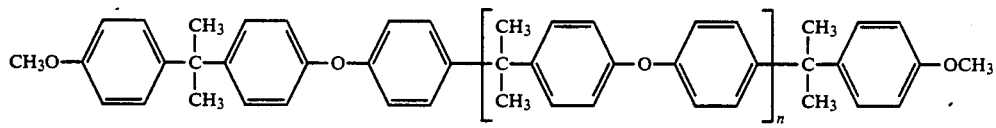

wherein n is an integer of 2 to 100.

* * * * *